(12) United States Patent
Huang et al.

(10) Patent No.: US 10,660,078 B2
(45) Date of Patent: May 19, 2020

(54) CONTROL INFORMATION SENDING METHOD AND RECEIVING METHOD, SENDER AND RECEIVER

(71) Applicant: China Academy of Telecommunications Technology, Beijing (CN)

(72) Inventors: Qiuping Huang, Beijing (CN); Runhua Chen, Beijing (CN); Qiubin Gao, Beijing (CN)

( * ) Notice: Subject to any disclaimer, the term of this patent is extended or adjusted under 35 U.S.C. 154(b) by 0 days.

(21) Appl. No.: 15/570,748

(22) PCT Filed: Apr. 26, 2016

(86) PCT No.: PCT/CN2016/080235
§ 371 (c)(1),
(2) Date: Oct. 30, 2017

(87) PCT Pub. No.: WO2016/173489
PCT Pub. Date: Mar. 11, 2016

(65) Prior Publication Data
US 2018/0160402 A1 Jun. 7, 2018

(30) Foreign Application Priority Data

Apr. 30, 2015 (CN) .......................... 2015 1 0217944

(51) Int. Cl.
*H04W 4/00* (2018.01)
*H04W 72/04* (2009.01)
(Continued)

(52) U.S. Cl.
CPC ......... *H04W 72/042* (2013.01); *H04J 11/005* (2013.01); *H04L 1/0027* (2013.01);
(Continued)

(58) Field of Classification Search
USPC ................................ 370/329, 328, 330, 336
See application file for complete search history.

(56) References Cited

U.S. PATENT DOCUMENTS

2011/0292891 A1* 12/2011 Hsieh ..................... H04L 5/001
370/329
2012/0322492 A1* 12/2012 Koo ...................... H04B 7/022
455/517
(Continued)

FOREIGN PATENT DOCUMENTS

CN 101505498 A 8/2009
CN 102195742 A 9/2011
(Continued)

*Primary Examiner* — Phuongchau Ba Nguyen
(74) *Attorney, Agent, or Firm* — Kilpatrick Townsend & Stockton, LLP

(57) ABSTRACT

Embodiments of the present application relate to the field of communications, and in particular, to a control information sending method and receiving method, a sender and a receiver, which are used for sending DCIs corresponding to DCI types to the receiver, thereby improving simplicity of interference suppression performed by the receiver. In the embodiments of the present application, a sender flexibly and optionally sends a first class of DCIs and/or a second class of DCIs. On one hand, when a receiver performs interference suppression on received interference signals, parameters of interference signals comprised in DCIs corresponding to a type of a received second class of DCIs can be used for interference suppression, thereby improving simplicity of interference suppression performed by the receiver; and on the other hand, when the receiver does not perform interference suppression on the received interference signals, a sender can send DCIs corresponding to a type of a first class of DCIs, and the first class of DCIs does not comprise the parameters of an interference signals, thereby
(Continued)

reducing load capacity of data transmission and further reducing data processing complexity of the receiver.

18 Claims, 3 Drawing Sheets

(51) Int. Cl.
| | |
|---|---|
| *H04L 1/00* | (2006.01) |
| *H04L 5/00* | (2006.01) |
| *H04J 11/00* | (2006.01) |
| *H04W 72/08* | (2009.01) |
| *H04B 7/0452* | (2017.01) |

(52) U.S. Cl.
CPC .......... *H04L 1/0038* (2013.01); *H04L 1/0048* (2013.01); *H04L 5/0023* (2013.01); *H04L 5/0053* (2013.01); *H04L 5/0073* (2013.01); *H04L 5/0091* (2013.01); *H04W 72/082* (2013.01); *H04W 72/085* (2013.01); *H04B 7/0452* (2013.01); *H04L 5/0037* (2013.01)

(56) References Cited

U.S. PATENT DOCUMENTS

| | | | |
|---|---|---|---|
| 2013/0265951 A1* | 10/2013 | Ng | H04W 72/042 370/329 |
| 2013/0324117 A1* | 12/2013 | Kim | H04L 1/0047 455/434 |
| 2014/0086184 A1* | 3/2014 | Guan | H04W 72/1289 370/329 |
| 2014/0177581 A1 | 6/2014 | Zhang et al. | |
| 2014/0334403 A1 | 11/2014 | Park et al. | |

FOREIGN PATENT DOCUMENTS

| | | | | |
|---|---|---|---|---|
| CN | 103856219 A | 6/2014 | | |
| CN | 104518806 A | 4/2015 | | |
| EP | 2280492 A1 | 2/2011 | | |
| WO | 2010024582 A2 | 3/2010 | | |
| WO | 2014182541 A2 | 11/2014 | | |
| WO | WO 2014/182541 A2 * | 11/2014 | ............... | H04L 5/00 |

* cited by examiner

CONTROL INFORMATION SENDING METHOD AND RECEIVING METHOD, SENDER AND RECEIVER

CROSS REFERENCE TO RELATED APPLICATION

This application is a National Stage of International Application No. PCT/CN2016/080235, filed Apr. 26, 2016, which claims the benefit of Chinese Patent Application No. 201510217944.9, filed with the Chinese Patent Office on Apr. 30, 2015 and entitled "A method for transmitting control information, a method for receiving control information, a transmitter, and a receiver", both of which are hereby incorporated by reference in their entireties.

FIELD

The present invention relates to the field of communications, and particularly to a method for transmitting control information, a method for receiving control information, a transmitter, and a receiver.

BACKGROUND

A predominant performance-limiting factor in a wireless cellular communication system is interference. There are two interference sources including intra-cell interference and inter-cell interference.

Inter-cell interference arises because a transmitter (e.g., an eNB) in an adjacent cell schedules another User Equipment (UE) in the adjacent cell at the same frequency. If different cells do not operate in a Coordinated Multi-Point (CoMP) mode, then there will be a considerable influence of inter-cell interference upon a UE at the edge of a cell.

Intra-cell interference arises primarily from an interfering UE paired with a target UE in a Multi-User Multiple-Input Multiple-Output (MU-MIMO) mode. The MU-MIMO mode is an important transmission mode in the wireless communication system. In a cell, a transmitter can schedule a plurality of UEs to transmit over the same time and/or frequency resource as a pair of UEs. In a pair of UEs, different beam-forming is applied to the different UEs, and a multi-access mode is enabled at different spatial positions of the UEs. If a beam-forming matrix of one of the UEs is well orthogonal to a channel of the other UE, then intra-cell interference may be lowered. Furthermore the different UEs can be configured with different power in a power configuration scheme, or the different UEs can be configured with different spreading codes in a spreading code configuration scheme, where the UEs can suppress interference using a sophisticated receiver. The MU-MIMO technology in the existing system is implemented using the transmitter as a result of scheduling, where the transmitter schedules the paired UE dynamically for the target UE, and interference of the paired UE to the target UE may be intra-cell interference or inter-cell interference.

As the technology is advancing, there emerges the sophisticated receiver capable of suppressing interference as compared with a traditional receiver incapable of suppressing interference, and the target UE can suppress the interference of the paired UE using the sophisticated receiver to thereby improve the performance of the target UE in receiving a signal.

The MU-MIMO technology in the existing system is implemented at the network side (e.g., the eNB) as a result of scheduling, and if one of the MU-MIMO paired UE attempts to suppress interference of an interfering signal received by the UE, then a highly complicated operational flow may be necessitated.

SUMMARY

Embodiments of the invention provide a method for transmitting control information, a method for receiving control information, a transmitter, and a receiver so that DCI corresponding to a type of DCI is transmitted to the receiver, and the receiver can obtain a parameter of an interfering signal received by the receiver, by decoding DCI corresponding to a second type of DCI, and suppress interference using the parameter of the interfering signal to thereby make it easier and more convenient for the receiver to suppress the interference.

Some embodiments of the invention provide a method for transmitting control information, the method includes steps of selecting a type of Downlink Control Information (DCI) including a first type of DCI and/or a second type of DCI, wherein the second type of DCI includes a parameter of an interference signal received by a receiver; and transmitting DCI corresponding to the selected type of DCI.

Optionally the selecting the type of DCI includes: selecting the type of DCI according to a type of receiver and/or an interference suppression scheme.

Optionally the selecting the type of DCI includes: selecting the type of DCI semi-statically or dynamically.

Optionally the method further includes: determining the number of blind detections corresponding to each type of DCI; and transmitting an indicator indicating the number of blind detections corresponding to each type of DCI.

Optionally the method further includes: transmitting an indicator indicating the selected type of DCI.

Optionally the method further includes: creating a mapping relationship between the type of DCI and a system parameter; and transmitting the mapping relationship between the type of DCI and the system parameter.

Optionally the transmitting the mapping relationship between the type of DCI and the system parameter includes: transmitting the mapping relationship between the type of DCI and the system parameter via dynamic signaling; or transmitting the mapping relationship between the type of DCI and the system parameter via semi-static signaling; or transmitting the mapping relationship between the type of DCI and the system parameter via static signaling.

Optionally the selecting the type of DCI includes: selecting types of DCI for sub-frames in groups of sub-frames in units of the groups of sub-frames.

Some embodiments of the invention provide a method for receiving control information, the method includes steps of: receiving Downlink Control Information (DCI) corresponding to a type of DCI selected by a transmitter, wherein the type of DCI includes a first type of DCI and/or a second type of DCI, and the second type of DCI includes a parameter of an interference signal received by the receiver; and decoding the received DCI.

Optionally the method further includes: receiving an indicator indicating the number of blind detections corresponding to each type of DCI, and detecting each type of DCI blindly according to the indicator indicating the number of blind detections corresponding to each type of DCI; or detecting each type of DCI blindly according to a prescribed number of blind detections corresponding to each type of DCI.

Optionally the decoding the received DCI includes: decoding the received DCI according to a received indicator of the type of DCI; or decoding the received DCI according to a prescribed type of DCI.

Optionally the decoding the received DCI includes: determining a type of DCI corresponding to a system parameter and a received mapping relationship between the type of DCI and the system parameter, and decoding the received DCI according to the determined type of DCI; or determining a type of DCI corresponding to a system parameter and a prescribed mapping relationship between the type of DCI and the system parameter, and decoding the received DCI according to the determined type of DCI.

Optionally the decoding the received DCI includes: determining the type of DCI corresponding to the received DCI according to a prescribed correspondence relationship between a sub-frame number and the type of DCI, and the sub-frame number corresponding to the received DCI, and decoding the received DCI according to the determined type of DCI.

Optionally the decoding the received DCI includes: decoding the received DCI according to the type of the receiver.

Optionally a decoding mode corresponding to the type of DCI includes any one of the following modes: the first type of DCI is detected and decoded; the second type of DCI is detected and decoded; and the first type of DCI and the second type of DCI are detected and decoded.

Some embodiments of the invention provide a transmitter including: a processing unit configured to select a type of Downlink Control Information (DCI) including a first type of DCI and/or a second type of DCI, wherein the second type of DCI includes a parameter of an interference signal received by a receiver; and a transmitting unit configured to transmit DCI corresponding to the selected type of DCI.

Optionally the processing unit is configured: to select the type of DCI according to a type of receiver and/or an interference suppress scheme.

Optionally the processing unit is configured: to select the type of DCI semi-statically or dynamically.

Optionally the processing unit is further configured: to determine the number of blind detections corresponding to each type of DCI; and the transmitting unit is further configured: to transmit an indicator indicating the number of blind detections corresponding to each type of DCI.

Optionally the transmitting unit is further configured: to transmit an indicator indicating the selected type of DCI.

Optionally the processing unit is further configured: to create a mapping relationship between the type of DCI and a system parameter; and the transmitting unit is further configured: to transmit the mapping relationship between the type of DCI and the system parameter.

Optionally the transmitting unit is configured: to transmit the mapping relationship between the type of DCI and the system parameter via dynamic signaling; or to transmit the mapping relationship between the type of DCI and the system parameter via semi-static signaling; or to transmit the mapping relationship between the type of DCI and the system parameter via static signaling.

Optionally the processing unit is configured: to select types of DCI for sub-frames in groups of sub-frames in units of the groups of sub-frames.

Some embodiments of the invention provide a receiver including: a receiving unit configured to receive Downlink Control Information (DCI) corresponding to a type of DCI selected by a transmitter, wherein the type of DCI includes a first type of DCI and/or a second type of DCI, and the second type of DCI includes a parameter of an interference signal received by the receiver; and a processing unit configured to decode the received DCI.

Optionally the processing unit is configured: to detect each type of DCI blindly according to a received indicator indicating the number of blind detections corresponding to each type of DCI; or to detect each type of DCI blindly according to a prescribed number of blind detections corresponding to each type of DCI.

Optionally the processing unit is configured: to decode the received DCI according to a received indicator indicating the type of DCI selected by the transmitter; or to decode the received DCI according to a prescribed type of DCI.

Optionally the processing unit is configured: to determine a type of DCI corresponding to a system parameter and a received mapping relationship between the type of DCI and the system parameter, and to decode the received DCI according to the determined type of DCI; or to determine a type of DCI corresponding to a system parameter and a prescribed mapping relationship between the type of DCI and the system parameter, and to decode the received DCI according to the determined type of DCI.

Optionally the processing unit is configured: to determine the type of DCI corresponding to the received DCI according to a prescribed correspondence relationship between a sub-frame number and the type of DCI, and the sub-frame number corresponding to the received DCI, and to decode the received DCI according to the determined type of DCI.

Optionally the processing unit is configured: to decode the received DCI according to the type of the receiver.

Optionally a decoding mode corresponding to the type of DCI includes any one of the following modes: the first type of DCI is detected and decoded; the second type of DCI is detected and decoded; and the first type of DCI and the second type of DCI are detected and decoded.

Some embodiments of the invention provide a transmitter including: a processor configured to read program in a memory, and to perform the processes of: selecting a type of DCI including a first type of DCI and/or a second type of DCI, wherein the second type of DCI includes a parameter of an interference signal received by a receiver; and transmitting DCI corresponding to the selected type of DCI through a transceiver; and the transceiver configured to be controlled by the processor to transmit the DCI corresponding to the selected type of DCI.

Some embodiments of the invention provide a receiver including: a transceiver configured to be controlled by a processor to receive DCI corresponding to a type of DCI selected by a transmitter, wherein the type of DCI includes a first type of DCI and/or a second type of DCI, and the second type of DCI includes a parameter of an interference signal received by the receiver; and the processor configured to read program in the memory, and to decode the received DCI.

In embodiments above of the invention, the transmitter selects a type of DCI, and transmits DCI corresponding to the selected type of DCI, where the type of DCI includes the first type of DCI and/or the second type of DCI, the first type of DCI does not include any parameter of an interference signal received by the receiver, and the second type of DCI includes a parameter of an interference signal received by the receiver. Apparently the transmitter can transmit the first type of DCI and/or the second type of DCI flexibly and selectively, so that on one hand, the receiver can suppress interference of the received interference signal by suppressing interference using the parameter of an interference signal received by the receiver, in the received DCI corresponding to the second type of DCI, thus making it easier and more convenient for the receiver to suppress the interference; and on the other hand, if the receiver does not suppress interference of the received interference signal, then the transmitter may selectively transmit the DCI corresponding to the first type of DCI, which does not include any parameter of an interference signal received by the receiver, thus reducing a load of data transmission, and further lowering the complexity of the receiver in processing the data.

BRIEF DESCRIPTION OF THE DRAWINGS

In order to make the technical solutions according to embodiments of the invention more apparent, the drawings to which reference is made in the description of the embodiments will be described below briefly, and apparently the drawings to be described below are merely illustrative of some of the embodiments of the invention, and those ordinarily skilled in the art can further derive other drawings from these drawings without any inventive effort.

DETAILED DESCRIPTION OF THE EMBODIMENTS

Figure 1:
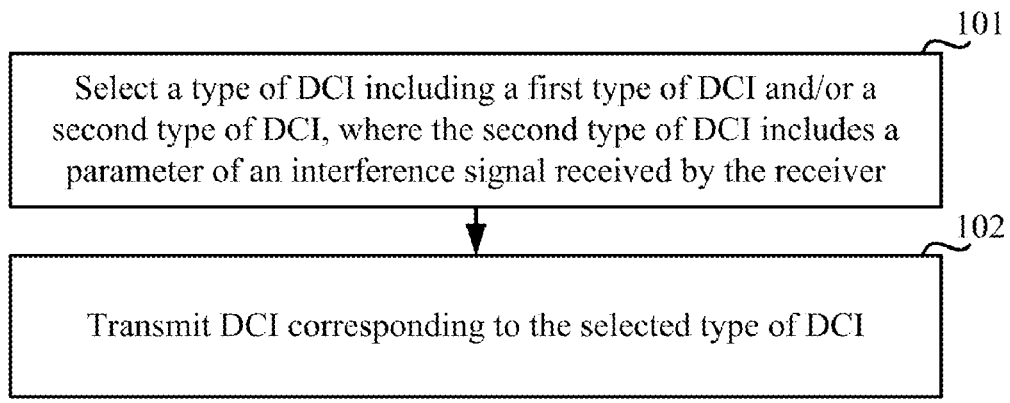
FIG. 1 is a schematic flow chart of a method for transmitting control information according to embodiments of the invention.

In order to make the objects, technical solutions, and advantages of the invention more apparent, the invention will be described below in further details with reference to the drawings, and apparently embodiments described below are only a part but not all of the embodiments of the invention. Based upon the embodiments here of the invention, all the other embodiments which can occur to those ordinarily skilled in the art without any inventive effort shall fall into the scope of the invention.

The embodiments of the invention can be applicable to a Long Term Evolution (LTE) system or Long Term Evolution-Advanced (LTE-A) system. The embodiments of the invention can be applicable to an MU-MIMO scenario, e.g., multi-user transmission based upon superimposed coding, etc.

Of course, the embodiments of the invention will not be only applicable to the LTE system or the LTE-A system, and the MU-MIMO scenario, but in another system or scenario, if signal transmission by some UE may be interfered with due to signal transmission by another UE, then the embodiments of the invention may also be applicable to interference suppression. For example, interference of a target UE to another cell may be suppressed, interference of another UE in the current cell may be suppressed, etc.

In embodiments of the invention, a receiver of a UE may be a traditional receiver or a sophisticated receiver. As compared with the traditional receiver, the sophisticated receiver is capable of suppressing interference. The sophisticated receiver may be categorized as follows.

An interference cancellation receiver may be further categorized into a Serial Interference Cancellation (SIC) receiver and a Parallel Interference Cancellation (PIC) receiver. The interference cancellation receiver operates under such a principle that a target UE firstly obtains a signal of an interfering UE as a result of demodulation, and then reconstructs an interference signal, and cancels the interference signal of the UE from a received signal, and thereafter the target UE obtains a signal of the target UE as a result of demodulation. The interference cancellation receiver can be categorized into a Symbol-level Serial Interference Cancellation (SSIC) receiver and a Codeword-level Interference Cancellation (CWIC) receiver.

A Maximum Likelihood (ML) receiver (or a less-complicated ML receiver) operates under such a principle that a target UE performs ML (or less-complicated ML) demodulation jointly on a signal of a target UE, and a signal of an interfering UE to thereby improve the performance of the target UE in receiving a signal.

For the sake of a convenient description, a first UE and a second UE are defined in the embodiments of the invention so that the first UE is a UE served by a transmitter, and the second UE is an interfering UE to the first UE, that is, a signal generated by the second UE is a signal to interfere with a receiver of the first UE. In the embodiments of the invention, the first UE and the second UE may cause intra-cell interference or inter-cell interference to each other. In the embodiments of the invention, the first UE and the second UE may reside in the same cell, or may reside in different cells. The number of second UEs may be one or more. For example, the first UE and the second UE may be UEs in a group of MU-MIMO paired users.

In the embodiments of the invention, only an example will be described in which the first UE in the group of MU-MIMO paired users transmits Downlink Control Information (DCI). The first UE here may be any one of the UEs in the group of MU-MIMO paired users, and all the other UEs than the first UE in the group of MU-MIMO paired users will be referred to as second UEs. Typically if the first UE and the second UE cause intra-cell interference to each other, that is, the first UE and the second UE are served by the same transmitter, then for each UE in a group of MU-MIMO paired users, the same transmitter may transmit control information to the first UE and the second UE as described in the embodiments of the invention. If the first UE and the second UE cause inter-cell interference to each other, that is, the first UE and the second UE are served by different transmitters, then for the respective transmitters, each transmitter may transmit control information to the corresponding UE served by the transmitter, and particularly the transmitter serving the first UE may transmit control information to the first UE, and the transmitter serving the second UE may transmit control information to the second UE.

In the following flow, a process in which the transmitter schedules the UEs using the MU-MIMO technology will not be limited to any particular process in the embodiments of the invention, although only an MU-MIMO based scheduling process will be described here. In this process, the UEs perform channel estimation, obtain channel matrixes between the UEs and the transmitter, and then feed modulation and coding scheme indexes corresponding to the largest Signal to Interference plus Noise Ratio (SINR) values back to the transmitter; and the transmitter collects the indexes fed back by the respective UEs, and pairs the UE according to the indexes fed back by the respective UEs, and also some criterion (e.g., a proportional fairness criterion). The number of UEs in the group of MU-MIMO paired users may be two or more.

FIG. 1 exemplarily illustrates a schematic flow chart of a method for transmitting control information according to embodiments of the invention. The flow may be performed at a transmitter, for example, it may be performed by a transmitter, an eNB, or a transmitter operable as an eNB. Referring to FIG. 1, a method for transmitting control information according to embodiments of the invention includes the following steps.

The step 101 is to select a type of DCI including a first type of DCI and/or a second type of DCI, where the second type of DCI includes a parameter of an interference signal received by the receiver.

The step 102 is to transmit DCI corresponding to the selected type of DCI.

In embodiments of the invention, there are two types of DCI, and the second type of DCI includes a parameter of an interference signal received by the receiver, and optionally the first type of DCI does not include any parameter of an interference signal received by the receiver. In the step 101, only the first type of DCI, or only the second type of DCI, or both the first type of DCI and the second type of DCI may be selected, and DCI corresponding to the selected type of DCI may be transmitted.

Optionally the type of DCI is selected semi-statically or dynamically.

By way of an example, there are the following four instances.

In a first instance, UEs can feed back channel quality information periodically or aperiodically, and an eNB (a transmitter) schedules the UEs periodically or aperiodically according to the channel quality information of the UEs, and determines the type of a receiver for the first UE.

In a second instance, an eNB updates types of receivers of UEs, and types of DCI periodically, and if there is a new UE accessing a cell, then the eNB will be triggered to reselect paired UEs, types of receivers, and types of DCIs for the scheduled UEs.

In a third instance, an eNB semi-statically receives interference signal information from another cell, and semi-statically selects types of receivers of UEs according to the interference information to thereby semi-statically select types of DCI of the UE.

In a fourth instance, an eNB can schedule UEs dynamically, and select types of receivers, and types of DCI of the UEs dynamically, for example, schedule the UEs at a sub-frame level.

Optionally the type of DCI is selected according to a type of receiver, and/or an interference suppression scheme, in the following three implementations.

The type of DCI is selected according to a type of receiver, the type of DCI is selected according to an interference suppression scheme, and the type of DCI is selected according to a type of receiver, and an interference suppression scheme.

The type of DCI can be selected particularly under one or more conditions, and the following several application scenarios thereof will be listed here.

In a first scenario, if the receiver of the first UE is a traditional receiver incapable of suppressing interference, then a first type of DCI will be selected. Since the receiver of the first UE is incapable of suppressing interference, the DCI, corresponding to the first type of DCI, transmitted at this time does not include any parameter of an interference signal received by the receiver, thus reducing a load of data transmission, and lowering the complexity of parsing the data by the first UE.

In a second scenario, if the receiver of the first UE is a sophisticated receiver capable of suppressing interference, then the second type of DCI will be selected. At this time, the first UE can suppress interference of a signal of the second UE according to the parameter, of the interference signal received by the receiver, included in the transmitted DCI corresponding to the second type of DCI, thus improving the performance of the first UE in receiving a signal.

In a third scenario, if the interference suppression scheme is that the first UE does not suppress interference of a received interference signal, then the first type of DCI will be selected no matter whether the receiver of the first UE is a sophisticated receiver or a traditional receiver. The DCI, corresponding to the first type of DCI, transmitted at this time does not include any parameter of an interference signal received by the receiver, thus reducing a load of data transmission, and lowering the complexity of parsing the data by the first UE.

In a fourth scenario, if the interference suppression scheme is that the first UE suppresses interference of a received interference signal, then the second type of DCI will be selected. At this time, the first UE can suppress interference of a signal of the second UE according to the parameter, of the interference signal received by the receiver, included in the transmitted DCI corresponding to the second type of DCI, thus improving the performance of the first UE in receiving a signal.

In a fifth scenario, if the interference suppression scheme is that the first UE suppresses interference of a received interference signal, and the receiver of the first UE is a sophisticated receiver, then the second type of DCI will be selected. At this time, the first UE can suppress interference of a signal of the second UE according to the parameter, of the interference signal received by the receiver, included in the transmitted DCI corresponding to the second type of DCI, thus improving the performance of the first UE in receiving a signal.

In a sixth scenario, if the interference suppression scheme is that the first UE suppresses interference of a received interference signal, and the receiver of the first UE is a traditional receiver, then the first type of DCI will be selected. The DCI, corresponding to the first type of DCI, transmitted at this time does not include any parameter of an interference signal received by the receiver, thus reducing a load of data transmission, and lowering the complexity of parsing the data by the first UE.

Apparently in embodiments of the invention, the first type of DCI and/or the second type of DCI may be selected freely, and the DCI corresponding to the selected type of DCI may be transmitted, instead of transmitting the same DCI for all the receivers, thus reducing a load of data transmission over a network, and further lowering the complexity of processing the data by the receiver of the first UE.

The interference suppression scheme in embodiments of the invention can be determined in a number of ways, for example, it can be specified manually, established and then distributed by the higher-layer transmitter, or determined by the transmitter according to a load condition of a cell where the first UE resides, the amount of traffic in the system, the capacity of the first UE, and other factors.

In the step 102 above, in a wireless communication system (e.g., an LTE system), the first UE is provided with the DCI of the first UE over a downlink control channel. The downlink control channel, and a downlink data channel of the first UE can be encoded and transmitted separately or jointly. Taking the Third Generation Partnership Project (3GPP) as an example, the DCI of the first UE is encoded and transmitted over a Physical Downlink Control Channel (PDCCH). Since the DCI carries a parameter for the first UE to decode a Physical Downlink Shared Channel (PDSCH) thereof, the PDCCH and the PDSCH are transmitted in the same sub-frame in the LTE system. The first UE needs to firstly decode the PDCCH to obtain the DCI, and then decode the PDSCH using the information obtained by decoding the DCI.

Since the DCI transmitted by the transmitter in embodiments of the invention may include two types of DCI, the transmitter in embodiments of the invention transmits the DCI corresponding to the selected type of DCI after selecting the type of DCI. Upon reception of the DCI, the receiver needs to determine the type of DCI transmitted by the transmitter, and further decodes the received DCI in a decoding mode corresponding to the determined type of DCI.

Optionally the receiver can determine the type of DCI selected by the transmitter in the following preferred schemes.

In a first scheme, an indicator indicating the selected type of DCI is transmitted.

Optionally the transmitter can transmit an indicator indicating the type of DCI selected by the transmitter, after selecting the type of DCI, so that upon reception of the indicator, the receiver determines the type of the DCI transmitted by the transmitter, and decodes the received DCI according to the determined type of DCI.

In an optional implementation, the eNB in the LTE system determines and transmits the indicator indicating the type of DCI selected by the transmitter, and further indicates the type of DCI to be detected blindly by the receiver, where both of the indicators can be signaled via Radio Resource Control (RRC) signaling.

In a second scheme, the type of DCI is prescribed.

Optionally the type of DCI is predefined in the standard, and the predefined type of DCI is known to both the transmitter and the receiver, so the transmitter will not further transmit any indicator indicating the type of DCI selected by the transmitter, and if the receiver receives the DCI corresponding to the type of DCI, then the receiver will decode the DCI directly in a decoding mode corresponding to the prescribed type of DCI according to the prescribed type of DCI. By way of an example, if the prescribed type of DCI is the second type of DCI, then the receiver will decode the received DCI in a decoding mode in which the second type of DCI can be decoded. If the prescribed type of DCI is the first type of DCI, then the receiver will decode the received DCI in a decoding mode in which the first type of DCI can be decoded. If the prescribed types of DCI are the first type of DCI and the second type of DCI, then the receiver will decode the received DCI in a decoding mode in which the first type of DCI and the second type of DCI can be decoded.

In a third implementation, the transmitter creates a mapping relationship between a type of DCI and a system parameter, and transmits the mapping relationship between the type of DCI and the system parameter. Optionally the mapping relationship can be specific to the receiver of the first UE.

Optionally the system parameter can be a system parameter carried in information transmitted by the transmitter, e.g., a sub-frame number, etc. The system parameter can alternatively be some system parameter throughout the communication system including the transmitter and the receiver. Upon reception of the DCI, the receiver can determine the type of DCI corresponding to the current system parameter according to the received mapping relationship between the type of DCI and the system parameter, and furthermore the receiver can decode the received DCI in the decoding mode corresponding to the determined type of DCI according to the type of DCI.

In a fourth scheme, a mapping relationship between a type of DCI and a system parameter is prescribed. Optionally the mapping relationship can be specific to the receiver of the first UE.

Optionally the mapping relationship between the type of DCI and the system parameter can be prescribed in the standard, and the pre-scribed mapping relationship is known to both the transmitter and the receiver. The system parameter is a system parameter carried in information transmitted by the transmitter, e.g., a sub-frame number, a frame number, etc. Upon reception of the DCI, the receiver can determine the type of DCI corresponding to the current system parameter according to the system parameter, and the prescribed mapping relationship between the type of DCI and the system parameter, and furthermore the receiver can decode the received DCI in the decoding mode corresponding to the determined type of DCI according to the type of DCI.

In a fifth scheme, a correspondence relationship between a sub-frame number and the type of DCI is prescribed in the standard, and the correspondence relationship is known to both the transmitter and the receiver.

The receiver selects types of DCI for sub-frames in groups of sub-frames in units of the groups of sub-frames. Optionally a first group of types of DCI is selected for a first group of sub-frames, and a second group of types of DCI is selected for a second group of sub-frames; and the first group of sub-frames does not overlap in time with the second group of sub-frames. By way of an example, the first group of types of DCI includes the first type of DCI and the second group of types of DCI includes the first type of DCI and the second type of DCI. The first group of sub-frames includes a sub-frame 1 and a sub-frame 6, and the second group of sub-frames includes a sub-frame 2 and a sub-frame 4.

The receiver determines the type of DCI corresponding to the received DCI according to the prescribed correspondence relationship between the sub-frame and the type of DCI, and a sub-frame corresponding to the received DCI, and decodes the received DCI according to the determined type of DCI.

In a sixth scheme, the received DCI is decoded according to the type of the receiver.

Optionally if the receiver of the first UE is a sophisticated receiver, then since the sophisticated receiver is capable of suppressing interference, the first UE will decode the received DCI in a decoding mode corresponding to the second type of DCI, and suppress interference using a parameter of interference information in the obtained second type of DCI. If receiver of the first UE is a traditional receiver, then since the traditional receiver is incapable of suppressing interference, the first UE will decode the received DCI in a decoding mode corresponding to the first type of DCI.

The type of DCI is determined in any one of the six preferred schemes above, and furthermore the receiver decodes the DCI corresponding to the determined type of DCI in the decoding mode corresponding to the type of DCI.

Optionally if the receiver determines the type of DCI selected by the transmitter as the first type of DCI, then the receiver may decode the first type of DCI in the decoding mode corresponding to the first type of DCI; if the receiver determines the type of DCI selected by the transmitter as the second type of DCI, then the receiver may decode the first type of DCI in the decoding mode corresponding to the second type of DCI; and if the receiver determines the types of DCI selected by the transmitter as the first type of DCI and the second type of DCI, then the receiver may decode in a decoding mode, corresponding to the first type of DCI or the second type of DCI, in which both the first type of DCI and the second type of DCI can be decoded.

In the example above, the decoding mode corresponding to the type of DCI includes any one of the following modes: detecting and decoding the first type of DCI, detecting and decoding the second type of DCI, and detecting and decoding the first type of DCI and the second type of DCI.

Optionally the decoding mode corresponding to the first type of DCI is either of the following two decoding modes: detecting and decoding the first type of DCI, and detecting and decoding the first type of DCI and the second type of DCI.

Optionally the decoding mode corresponding to the second type of DCI is either of the following two decoding modes: detecting and decoding the second type of DCI, and detecting and decoding the first type of DCI and the second type of DCI.

The decoding mode in which both the first type of DCI and the second type of DCI are detected and decoded is a decoding mode in which both the first type of DCI and the second type of DCI can be decoded.

Optionally if the receiver needs to decode both the first type of DCI and the second type of DCI, then it may be specified in embodiments of the invention that if the receiver of the first UE obtains the parameter of an interference signal in the second type of DCI as a result of parsing, then the first UE will suppress interference of the interference signal received by the receiver; otherwise, it will not suppress interference of the interference signal received by the receiver.

In the third scheme above, the transmitter can transmit the mapping relationship between the type of DCI and the system parameter particularly in any one of the following approaches after creating the mapping relationship between the type of DCI and the system parameter.

In a first approach, the mapping relationship between the type of DCI and the system parameter is transmitted via dynamic signaling.

In a second approach, the mapping relationship between the type of DCI and the system parameter is transmitted via semi-static signaling.

In a third approach, the mapping relationship between the type of DCI and the system parameter is transmitted via static signaling.

In the first approach above, the dynamic signaling refers to signaling which can be transmitted dynamically. The mapping relationship between the type of DCI and the system parameter is transmitted via dynamic signaling by transmitting the mapping relationship between the type of DCI and the system parameter dynamically, for example, the mapping relationship can be transmitted in each sub-frame.

In the second approach above, the mapping relationship between the type of DCI and the system parameter is transmitted via semi-static signaling, where the mapping relationship between the type of DCI and the system parameter varies over a long period of time, for example, the signaling is transmitted once in a period of time of tens or hundreds of sub-frames, so the transmitter transmits a new mapping relationship at a low frequency adapted to the characteristic of a semi-static notification, for example, the transmitter transmits the mapping relationship to the receiver once per tens or hundreds of sub-frames. In the LTE system, a possible semi-static indicator is RRC signaling.

In the third approach above, the mapping relationship between the type of DCI and the system parameter is transmitted via static signaling, where the mapping relationship between the type of DCI and the system parameter is invariable, and the transmitter transmits the mapping relationship to the receiver only once.

Optionally DCI of each first UE can be transmitted at a number of coding rates. In the LTE system, each UE can only place a PDCCH at a limited group of Control Channel Element (CCE) positions. The DCI of the first UE is encoded, modulated, and mapped onto a PDCCH, and an aggregation level of the PDCCH may be 1, 2, 4, or 8 CCEs. The UE detects the PDCCH thereof blindly in a search space including CCE positions at which the UE searches for the PDCCH. The search space of the UE includes a plurality of possible candidate PDCCHs. A different CCE aggregation level may correspond to a different number of candidate PDCCHs to be searched. As specified in the protocol, for example, there are 6, 6, 2, and 2 candidate PDCCHs respectively at the aggregation levels 1, 2, 4, and 8. The first UE detects a control signal blindly by detecting the candidate PDCCHs in the PDCCH search space at the different CCE aggregation levels.

The receiver of the first UE in embodiments of the invention may need to detect and decode a number of types of DCI, e.g., the first type of DCI and the second type of DCI, thus increasing the complexity of blind detection by the receiver of the first UE. Optionally in embodiments of the invention, the receiver can determine for each type of DCI the number of blind detections corresponding to each type of DCI in the following two schemes.

In a first scheme, the transmitter determines the number of blind detections corresponding to each type of DCI, and transmits an indicator indicating the number of blind detections corresponding to each type of DCI.

Optionally the transmitter configures each type of DCI reasonably with a number of blind detections, and signals the number of blind detections directly to the receiver of the first UE; or transmits an indicator indicating the number of blind detections by the first UE to the first UE.

In a second scheme, the number of blind detections corresponding to each type of DCI is prescribed.

Optionally the number of blind detections corresponding to each type of DCI can be prescribed in the standard, and known to both the transmitter and the receiver. The transmitter can detect each type of DCI blindly according to the prescribed number of blind detections corresponding to each type of DCI.

In order to reduce or limit the number of blind detections, for each type of DCI to be detected and decoded, e.g., the first type of DCI and the second type of DCI, both the PDCCH aggregation levels, and the number of candidate PDCCHs to be detected at each PDCCH aggregation level can be configured by the transmitter, or be specified in the standard. The number of blind detections may be independent of the aggregation level, or may be dependent upon the aggregation level. By way of an example, the transmitter configures the numbers of blind detections, 2, 2, 1, and 1 for a traditional DCI format at the aggregation levels 1, 2, 4, and 8; and the numbers of blind detections, 4, 4, 1, and 1 for the new DCI format at the respective aggregation levels. The number of blind detections by the first UE may be dependent upon the capability of the UE.

Optionally in embodiments of the invention, in order to enable the transmitter to select the type of DCI reasonably, the UE may further need to report whether the receiver of the UE is capable of suppressing interference as a sophisticated receiver. By way of an example, the UE may report to the transmitter that the UE is incapable of suppressing interference as a sophisticated receiver; or the UE may report to the transmitter that the UE is capable of suppressing interference as a sophisticated receiver, but cannot operate with a sophisticated receiver and a traditional receiver in the same sub-frame; or the UE may report to the transmitter that the UE can operate with a sophisticated receiver and a traditional receiver in the same sub-frame. The transmitter can configure a reasonable DCI decoding mode to the UE according to the information reported by the UE.

On the other hand, the proportion of UEs with a traditional receiver to UEs with a sophisticated receiver is determined by a load of the system, and may vary frequently. Data traffic may also burst, and may vary frequently in the network. In order to lower a load of information to be carried in the DCI, and also improve the flexibility of the transmitter in scheduling the UEs, optionally the transmitter selects an appropriate type of DCI for the first UE according to a load of the cell, the amount of traffic in the system, and the capacity of the UE.

In another example, for example, if there is interference to the first UE respectively from interference signals of a third UE and a fourth UE, then the first UE may firstly cancel the interference of the interference signal of the third UE, and then cancel the interference of the interference signal of the fourth UE, where there is interference of the interference signal of the fourth UE to demodulation of the interference signal of the third UE; or the first UE may firstly cancel the interference of the interference signal of the fourth UE, and then cancel the interference of the interference signal of the third UE, where there is interference of the interference signal of the third UE to demodulation of the interference signal of the fourth UE. As can be apparent, a Signal Noise Ratio (SNR) is affected by the demodulation order, and the transmitter, e.g., the eNB, scheduling the UEs will also select a corresponding Modulation and Coding Scheme (MCS) according to a demodulation order expected by the transmitter. At the receiver side of the UE, in order to enable the SNR of the demodulation to match an SNR expected by the scheduling transmitter, the demodulation order of the UEs shall agree with the demodulation order expected by the scheduling transmitter, so the transmitter can notify the UEs of the order in which the signals are demodulated at the UE side, for example, firstly the interference signal of the third UE, and then the interference signal of the fourth UE are cancelled, or firstly interference signal of the fourth UE, and the interference signal of the third UE are cancelled.

In another scheme, the DCI of the first UE can always include the parameter of an interference signal received by the first UE.

In the disclosure above, optionally the parameter of an interference signal received by the receiver includes any one or combination of the following parameters. Those skilled in the art can appreciate that the parameter of an interference signal can alternatively include other parameters than those listed below.

The number of antenna ports, and a Cell-specific Reference Signal (CRS); a mapping scheme; Channel State Information Reference Signal (CSI-RS) resource information, where the CSI-RS resources include a zero-power CSI-RS resource and a non-zero-power CSI-RS resource; signal power information; an MCS, where the transmitter can notify the first UE of an MCS of the second UE via dynamic signaling over a PDCCH or an Enhanced Physical Downlink Control Channel (EPDCCH) of the first UE; an Rank Indicator (RI), and a Pre-coding Matrix Indicator (PMI); scrambling code information, which can be an indicator of a scrambling code to be used, e.g., a scrambling code ID, or a Virtual Cell Identifier (VCID); a beam-forming matrix; transmit power; and a pre-coding matrix.

The mapping scheme refers to a mapping pattern of CRSs to the time/frequency. In the LTE system, there are different frequency shifts in the frequency domain for the CRSs in different cells with respect to Cell_IDs thereof, and the CRSs with the different frequency shifts are mapped onto different resource elements, thus alleviating interference between the CRSs in the different cells, where the value of a frequency shift corresponds to Mod (Cell_ID-6). The mapping scheme reflects the mapping of the CRSs to the resources. PDSCH signals transmitted in another cell are mapped around the CRS signals, and there are no other signals to be transmitted in the resource elements carrying the CRSs, so the mapping of the PDSCHs in the time or frequency domain is also conveyed in the information of the CRSs accordingly.

The transmitter can transmit the MCS of the second UE to the first UE, or can transmit the difference between the MCS of the second UE and the MCS of the first UE to the first UE, so that the first UE determines the MCS of the second UE.

If it is determined that the control information transmitted to the first UE includes the parameter of an interference signal of the second UE, then in order to reduce the amount of data to be transmitted to the first UE, optionally the parameter of an interference signal may be indicated in a subset restriction mode in embodiments of the invention.

Simply the subset restriction mode refers to a group of possible parameters of an interference signal of the second UE is pre-stored in a subset of parameters, and the elements in the sub-set can be transmitted to the first UE via higher-layer signaling, so that the parameter of an interference signal of the second UE can be transmitted to the first UE by transmitting an index of the parameter of an interference signal in the subset of parameters to the first UE, so that the first UE retrieves the corresponding parameter from the subset of parameters according to the index. Optionally a subset of parameters includes a group of parameters available to the second UE, and a subset of parameters includes the same type of all the parameters.

Furthermore since some parameter of the second UE may be the same as that of the first UE, in order to reduce the amount of information to be transmitted, optionally in embodiments of the invention, an indicator is transmitted to the first UE to indicate that some type of parameter or types of parameters of the second UE takes or take the same value or values as the same type of parameter or types of parameters of the first UE, so that the first UE suppresses interference of the signal of the second UE according to its own parameter or parameters.

By way of an example, the transmitter can transmit a first indicator to the first UE to indicate any one or combination of follows.

A cell where the second UE resides has the same number of antenna port CRSs, and mapping scheme as a cell where the first UE resides; a cell where the second UE resides has the same MSBFN sub-frame configuration as a cell where the first UE resides; a cell where the second UE resides has the same PDSCH starting symbol position as a cell where the first UE resides; and a signal of the second UE has the same mapping scheme as a signal of the first UE.

Furthermore since parameter required for a UE to suppress interference are dependent upon a type of receiver, and different parameters of an interference signal may be applied to different types of receives, optionally if it is determined that the control information transmitted to the first UE includes the parameters of an interference signal, then the types of parameters for the parameters of an interference signal of the second UE to be transmitted to the first UE may be determined according to the type of the receiver of the first UE.

In embodiments of the invention, the parameter of an interference signal received by the receiver can be transmitted in any one of the following approaches.

In a first approach, the transmitter can transmit the parameter of an interference signal received by the receiver separately to the receiver of the first UE via semi-static signaling.

Optionally the parameter of an interference signal received by the receiver is transmitted to the receiver via semi-static signaling, where the parameter of an interference signal received by the receiver varies over a long period of time, for example, the signaling is transmitted once in a period of time of tens or hundreds of sub-frames, so the transmitter transmits a new parameter of an interference signal received by the receiver at a low frequency adapted to the characteristic of a semi-static notification, for example, the transmitter transmits the parameter of an interference signal received by the receiver to the receiver once per tens or hundreds of sub-frames. In the LTE system, a possible semi-static indicator is RRC signaling.

In a second approach, the transmitter can transmit the parameter of an interference signal received by the receiver separately to the receiver of the first UE via dynamic signaling.

Optionally the dynamic signaling refers to signaling which can be transmitted dynamically. The parameter of an interference signal received by the receiver is transmitted to the receiver via dynamic signaling, where the signaling for the transmitter to transmit the parameter of an interference signal received by the receiver to the receiver is transmitted dynamically, for example, the signaling can be transmitted in each sub-frame, so that the receiver suppresses interference according to the parameter of an interference signal received by the receiver in the current scheduling period. In the LTE system, the dynamic signaling is typically transmitted over a PDCCH or an EPDCCH.

For example, the parameter of an interference signal can be carried in DCI, thus resulting in a new DCI format, and the DCI in the new format can be transmitted to the receiver of the first UE over a PDCCH. In embodiments of the invention, a type of DCI carrying a parameter of an interference signal will be referred to the second type of DCI, and a type of DCI carrying no parameter of an interference signal will be referred to the first type of DCI. Alternatively they can be denominated otherwise, for example, a DCI format corresponding to the first type of DCI can be referred to as a traditional DCI format or a DCI A format, and a DCI format corresponding to the second type of DCI can be referred to as a new DCI format or a DCI B format.

In a third approach, the transmitter transmits a part of the information in the parameters of an interference signal received by the receiver to the receiver via dynamic signaling, and the remaining part of the information in the parameters of an interference signal received by the receiver to the receiver via semi-static signaling.

In the third approach above, the transmitter transmits a part of the information in the parameters of an interference signal received by the receiver to the receiver via dynamic signaling, and the remaining part of the information in the parameters of an interference signal received by the receiver to the receiver via semi-static signaling, where the transmitter transmits those frequently varying parameters among the parameters of an interference signal received by the receiver to the receiver via dynamic signaling. for example, the transmitter can transmit the signaling in each sub-frame, so that the receiver suppresses interference according to the parameters of an interference signal received by the receiver in the current scheduling period; and the transmitter transmits the remaining part of the information in the parameters of an interference signal received by the receiver, i.e., information varying at an interval of a long period of time, via semi-static signaling, for example, the transmit transmits it once in a period of time of tens or hundreds of sub-frames.

In a possible hybrid scheme, a set of some specific parameters of an interference signal received by the receiver can be configured as provided via higher-layer signaling, and transmitted semi-statically. The first UE detects blindly the configured subset to obtain the real parameter of an interference signal. This scheme can lower a signaling load for the parameter of an interference signal in the DCI. Taking as an example 16 possible parameters of an interference signal to be configured, if four possible subsets are configured for the parameter of an interference signal in the semi-static signaling, then there will are only two bits instead of four bits to be occupied in the DCI.

In summary, the embodiments of the invention, the transmitter can transmit the first type of DCI and/or the second type of DCI flexibly and selectively. On one hand, the receiver can suppress interference of the received interference signal by suppressing interference using the parameter of an interference signal received by the receiver, in the received DCI corresponding to the second type of DCI, thus making it easier and more convenient for the receiver to suppress the interference; and on the other hand, if the receiver does not suppress interference of the received interference signal, then the transmitter may selectively transmit the DCI corresponding to the first type of DCI, which does not include any parameter of an interference signal received by the receiver, thus reducing a load of data transmission, and further lowering the complexity of the receiver in processing the data.

Figure 2:
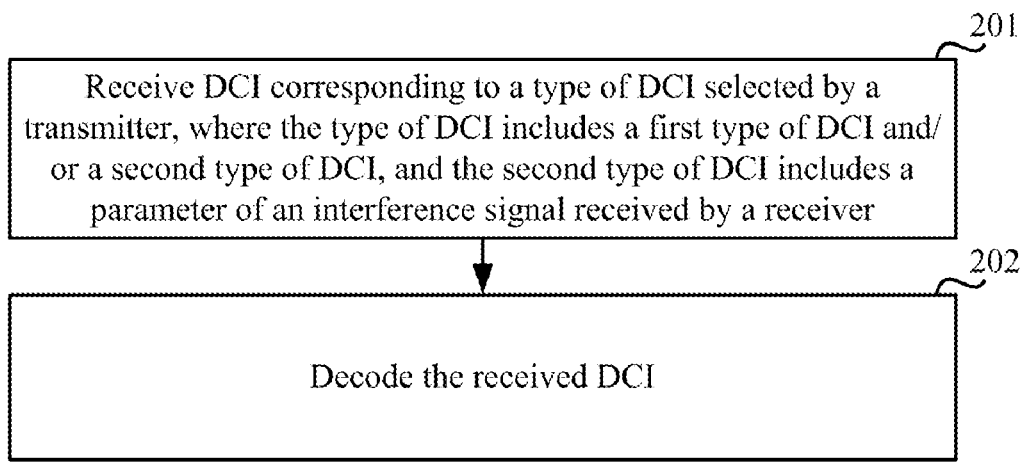
FIG. 2 is a schematic flow chart of a method for receiving control information according to embodiments of the invention.

FIG. 2 exemplarily illustrates a schematic flow chart of a method for receiving control information according to embodiments of the invention.

Based upon the same idea, embodiments of the invention provide a method for receiving control information as illustrated in FIG. 2, where the method includes the following steps.

The step 201 is to receive DCI corresponding to a type of DCI selected by a transmitter, where the type of DCI includes a first type of DCI and/or a second type of DCI, and the second type of DCI includes a parameter of an interference signal received by a receiver; and the step 202 is to decode the received DCI.

Optionally the first type of DCI does not include any parameter of an interference signal received by the receiver. A particular implementation in which the transmitter selects the type of DCI will be as described above, so a repeated description thereof will be omitted here. In the step 202 above, the receiver needs to decode the DCI by decoding the received DCI according to the type of DCI transmitted by the transmitter. Optionally the receiver can determine the type of DCI selected by the transmitter in the following preferred schemes.

In a first scheme, the receiver decodes the received DCI according to an indicator of the selected type of DCI.

Optionally the transmitter can transmit an indicator indicating the type of DCI selected by the transmitter, after selecting the type of DCI, so that upon reception of the indicator, the receiver determines the type of the DCI transmitted by the transmitter, and decodes the received DCI according to the determined type of DCI.

In an optional implementation, an eNB in an LTE system determines and transmits the indicator indicating the type of DCI selected by the transmitter, and further indicates the type of DCI to be detected blindly by the receiver, where both of the indicators can be signaled via RRC signaling.

In a second scheme, the receiver decodes the received DCI according to the prescribed type of DCI.

Optionally the type of DCI is predefined in the standard, and known to both the transmitter and the receiver, so the transmitter will not further transmit any indicator indicating the type of DCI selected by the transmitter, and if the receiver receives the DCI corresponding to the type of DCI, then the receiver will decode the DCI directly in a decoding mode corresponding to the prescribed type of DCI according to the prescribed type of DCI. By way of an example, if the prescribed type of DCI is the second type of DCI, then the receiver will decode the received DCI in a decoding mode in which the second type of DCI can be decoded. If the prescribed type of DCI is the first type of DCI, then the receiver will decode the received DCI in a decoding mode in which the first type of DCI can be decoded. If the prescribed types of DCI are the first type of DCI and the second type of DCI, then the receiver will decode the received DCI in a decoding mode in which the first type of DCI and the second type of DCI can be decoded.

In a third implementation, the receiver determines a type of DCI corresponding to a system parameter and a received mapping relationship between the type of DCI and the system parameter, and decodes the received DCI according to the determined type of DCI. Optionally the mapping relationship can be specific to the receiver of the first UE.

Optionally the system parameter can be a system parameter carried in information transmitted by the transmitter, e.g., a sub-frame number, etc. Upon reception of the DCI, the receiver can determine the type of DCI corresponding to the system parameter carried in the currently received information according to the system parameter, and the received mapping relationship between the type of DCI and the system parameter, and furthermore the receiver can decode the received DCI in the decoding mode corresponding to the determined type of DCI according to the type of DCI.

In a fourth scheme, the receiver determines a type of DCI corresponding to a system parameter and a prescribed mapping relationship between the type of DCI and the system parameter, and decodes the received DCI according to the determined type of DCI. Optionally the mapping relationship can be specific to the receiver of the first UE.

Optionally the mapping relationship between the type of DCI and the system parameter can be prescribed in the standard, and the pre-scribed mapping relationship is known to both the transmitter and the receiver. The system parameter is a system parameter carried in information transmitted by the transmitter, e.g., a sub-frame number, etc. Upon reception of the DCI, the receiver can determine the type of DCI corresponding to the system parameter carried in the currently received information according to the system parameter, and the prescribed mapping relationship between the type of DCI and the system parameter, and furthermore the receiver can decode the received DCI in the decoding mode corresponding to the determined type of DCI according to the type of DCI.

In a fifth scheme, the receiver determines the type of DCI corresponding to the received DCI according to a prescribed correspondence relationship between a sub-frame number and the type of DCI, and the sub-frame number corresponding to the received DCI, and decodes the received DCI according to the determined type of DCI.

The receiver selects types of DCI for sub-frames in groups of sub-frames in units of the groups of sub-frames. Optionally the receiver selects a first group of types of DCI for a first group of sub-frames, and a second group of types of DCI for a second group of sub-frames; and the first group of sub-frames does not overlap in time with the second group of sub-frames. By way of an example, the first group of types of DCI includes the first type of DCI and the second group of types of DCI includes the first type of DCI and the second type of DCI. The first group of sub-frames includes a sub-frame 1 and a sub-frame 6, and the second group of sub-frames includes a sub-frame 2 and a sub-frame 4.

The receiver determines the type of DCI corresponding to the received DCI according to the prescribed correspondence relationship between the sub-frame and the type of DCI, and a sub-frame corresponding to the received DCI, and decodes the received DCI according to the determined type of DCI.

In a sixth scheme, the receiver decodes the received DCI according to the type of the receiver.

Optionally if the receiver of the first UE is a sophisticated receiver, then since the sophisticated receiver is capable of suppressing interference, the first UE will decode the received DCI in a decoding mode corresponding to the second type of DCI, and suppress interference using a parameter of interference information in the obtained second type of DCI. If receiver of the first UE is a traditional receiver, then since the traditional receiver is incapable of suppressing interference, the first UE will decode the received DCI in a decoding mode corresponding to the first type of DCI.

The type of DCI is determined in any one of the six preferred schemes above, and furthermore the receiver decodes the DCI corresponding to the determined type of DCI in the decoding mode corresponding to the type of DCI.

Optionally if the receiver determines the type of DCI selected by the transmitter as the first type of DCI, then the receiver may decode the first type of DCI in the decoding mode corresponding to the first type of DCI; if the receiver determines the type of DCI selected by the transmitter as the second type of DCI, then the receiver may decode the first type of DCI in the decoding mode corresponding to the second type of DCI; and if the receiver determines the types of DCI selected by the transmitter as the first type of DCI and the second type of DCI, then the receiver may decode in a decoding mode, corresponding to the first type of DCI or the second type of DCI, in which both the first type of DCI and the second type of DCI can be decoded.

In the example above, the decoding mode corresponding to the type of DCI includes any one of the following modes: detecting and decoding the first type of DCI, detecting and decoding the second type of DCI, and detecting and decoding the first type of DCI and the second type of DCI.

Optionally the decoding mode corresponding to the first type of DCI is either of the following two decoding modes:

detecting and decoding the first type of DCI, and detecting and decoding the first type of DCI and the second type of DCI.

Optionally the decoding mode corresponding to the second type of DCI is either of the following two decoding modes: detecting and decoding the second type of DCI, and detecting and decoding the first type of DCI and the second type of DCI.

The decoding mode in which both the first type of DCI and the second type of DCI are detected and decoded is a decoding mode in which both the first type of DCI and the second type of DCI can be decoded.

Optionally if the receiver needs to decode both the first type of DCI and the second type of DCI, then it may be specified in embodiments of the invention that if the receiver of the first UE obtains the parameter of an interference signal in the second type of DCI as a result of parsing, then the first UE will suppress interference of the interference signal received by the receiver; otherwise, it will not suppress interference of the interference signal received by the receiver.

The receiver of the first UE in the embodiment of the invention may need to detect and decode a number of types of DCI, e.g., the first type of DCI and the second type of DCI, thus increasing the complexity of blind detection by the receiver of the first UE. Optionally in embodiments of the invention, the receiver can determine for each type of DCI the number of blind detections corresponding to each type of DCI in the following two schemes.

In a first scheme, the receiver receives an indicator indicating the number of blind detections corresponding to each type of DCI, and detects each type of DCI blindly according to the indicator indicating the number of blind detections corresponding to that type of DCI.

Optionally the transmitter configures each type of DCI reasonably with a number of blind detections, and signals the number of blind detections directly to the receiver of the first UE; or transmits an indicator indicating the number of blind detections by the first UE to the first UE.

In a second scheme, the receiver detects each type of DCI blindly according to a prescribed number of blind detections corresponding to each type of DCI.

Optionally the number of blind detections corresponding to each type of DCI can be prescribed in the standard, and known to both the transmitter and the receiver. The transmitter can detect each type of DCI blindly according to the prescribed number of blind detections corresponding to each type of DCI.

In summary, in embodiments of the invention, the transmitter can transmit the first type of DCI and/or the second type of DCI flexibly and selectively, so that on one hand, the receiver can suppress interference of the received interference signal by suppressing interference using the parameter of an interference signal received by the receiver, in the received DCI corresponding to the second type of DCI, thus making it easier and more convenient for the receiver to suppress the interference; and on the other hand, if the receiver does not suppress interference of the received interference signal, then the transmitter may selectively transmit the DCI corresponding to the first type of DCI, which does not include any parameter of an interference signal received by the receiver, thus reducing a load of data transmission, and further lowering the complexity of the receiver in processing the data.

Figure 3:
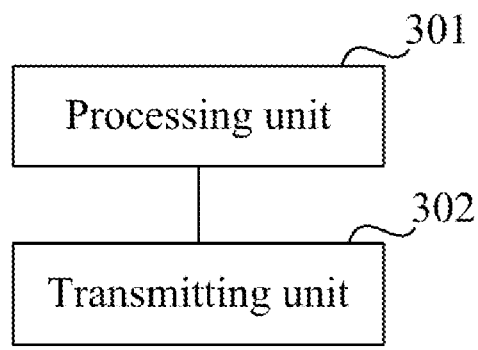
FIG. 3 is a schematic structural diagram of a transmitter according to embodiments of the invention.

FIG. 3 exemplarily illustrates a schematic structural diagram of a transmitter according to embodiments of the invention.

Based upon the same idea, FIG. 3 illustrates a schematic structural diagram of a transmitter according to embodiments of the invention for performing the flow of the method above, where the transmitter includes a processing unit 301 and a transmitting unit 302.

The processing unit 301 is configured to select a type of Downlink Control Information (DCI) including a first type of DCI and/or a second type of DCI, where the second type of DCI includes a parameter of an interference signal received by a receiver.

The transmitting unit 302 is configured to transmit DCI corresponding to the selected type of DCI.

Optionally the first type of DCI does not include any parameter of an interference signal received by the receiver.

Optionally the processing unit 301 is configured to select the type of DCI semi-statically or dynamically.

Optionally the processing unit 301 is configured to select the type of DCI according to a type of receiver, and/or an interference suppression scheme, particularly in the following three implementations.

The type of DCI is selected according to a type of receiver; the type of DCI is selected according to an interference suppression scheme; and the type of DCI is selected according to a type of receiver, and an interference suppression scheme.

Optionally the processing unit 301 is further configured to determine the number of blind detections corresponding to each type of DCI.

The transmitting unit 302 is further configured to transmit an indicator indicating the number of blind detections corresponding to each type of DCI.

Optionally the transmitting unit 302 is further configured: to transmit an indicator indicating the type of DCI selected by the transmitter.

Optionally the processing unit 301 is further configured to create a mapping relationship between the type of DCI and a system parameter.

The transmitting unit 302 is further configured to transmit the mapping relationship between the type of DCI and the system parameter.

Optionally the transmitting unit 302 is configured to transmit the mapping relationship between the type of DCI and the system parameter via dynamic signaling; or to transmit the mapping relationship between the type of DCI and the system parameter via semi-static signaling; or to transmit the mapping relationship between the type of DCI and the system parameter via static signaling.

Optionally the processing unit 301 is configured to select types of DCI for sub-frames in groups of sub-frames in units of the groups of sub-frames. Optionally a first group of types of DCI is selected for a first group of sub-frames, and a second group of types of DCI is selected for a second group of sub-frames; and the first group of sub-frames does not overlap in time with the second group of sub-frames.

In summary, in embodiments of the invention, the transmitter can transmit the first type of DCI and/or the second type of DCI flexibly and selectively. On one hand, the receiver can suppress interference of the received interference signal by suppressing interference using the parameter of an interference signal received by the receiver, in the received DCI corresponding to the second type of DCI, thus making it easier and more convenient for the receiver to suppress the interference; and on the other hand, if the receiver does not suppress interference of the received interference signal, then the transmitter may selectively transmit the DCI corresponding to the first type of DCI, which does not include any parameter of an interference signal received by the receiver, thus reducing a load of data transmission, and further lowering the complexity of the receiver in processing the data.

Figure 4:
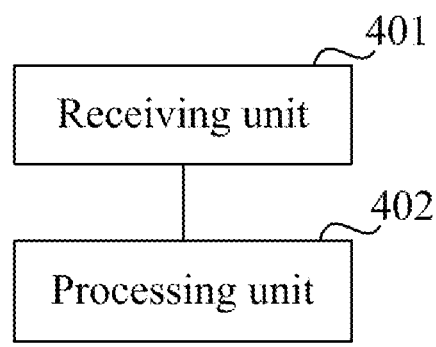
FIG. 4 is a schematic structural diagram of a user equipment according to embodiments of the invention.

FIG. 4 exemplarily illustrates a schematic structural diagram of a receiver according to embodiments of the invention.

Based upon the same idea, FIG. 4 illustrates a schematic structural diagram of a receiver according to embodiments of the invention for performing the flow of the method above, where the receiver includes a receiving unit 401 and a processing unit 402.

The receiving unit 401 is configured to receive Downlink Control Information (DCI) corresponding to a type of DCI selected by a transmitter, where the type of DCI includes a first type of DCI and/or a second type of DCI, and the second type of DCI includes a parameter of an interference signal received by the receiver.

The processing unit 402 is configured to decode the received DCI.

Optionally the first type of DCI does not include any parameter of an interference signal received by the receiver.

Optionally the processing unit 402 is further configured to detect each type of DCI blindly according to a received indicator indicating the number of blind detections corresponding to each type of DCI.

Optionally the processing unit 402 is further configured to detect each type of DCI blindly according to a prescribed number of blind detections corresponding to each type of DCI.

Optionally the processing unit 402 is further configured to decode the received DCI according to a received indicator indicating the type of DCI selected by the transmitter.

Optionally the processing unit 402 is further configured to decode the received DCI according to a prescribed type of DCI.

Optionally the processing unit 402 is further configured to determine a type of DCI corresponding to a system parameter and a received mapping relationship between the type of DCI and the system parameter, and to decode the received DCI according to the determined type of DCI.

Optionally the processing unit 402 is further configured to determine a type of DCI corresponding to a system parameter and a prescribed mapping relationship between the type of DCI and the system parameter, and to decode the received DCI according to the determined type of DCI.

Optionally the processing unit 402 is further configured to determine the type of DCI corresponding to the received DCI according to a prescribed correspondence relationship between a sub-frame number and the type of DCI, and the sub-frame number corresponding to the received DCI, and to decode the received DCI according to the determined type of DCI.

Optionally the processing unit 402 is further configured to decode the received DCI according to the type of the receiver.

Optionally a decoding mode corresponding to the type of DCI includes any one of the following modes.

Detecting and decoding the first type of DCI; detecting and decoding the second type of DCI; and detecting and decoding the first type of DCI and the second type of DCI.

In summary, in embodiments of the invention, the transmitter can transmit the first type of DCI and/or the second type of DCI flexibly and selectively, so that on one hand, the receiver can suppress interference of the received interference signal by suppressing interference using the parameter of an interference signal received by the receiver, in the received DCI corresponding to the second type of DCI, thus making it easier and more convenient for the receiver to suppress the interference; and on the other hand, if the receiver does not suppress interference of the received interference signal, then the transmitter may selectively transmit the DCI corresponding to the first type of DCI, which does not include any parameter of an interference signal received by the receiver, thus reducing a load of data transmission, and further lowering the complexity of the receiver in processing the data.

Figure 5:
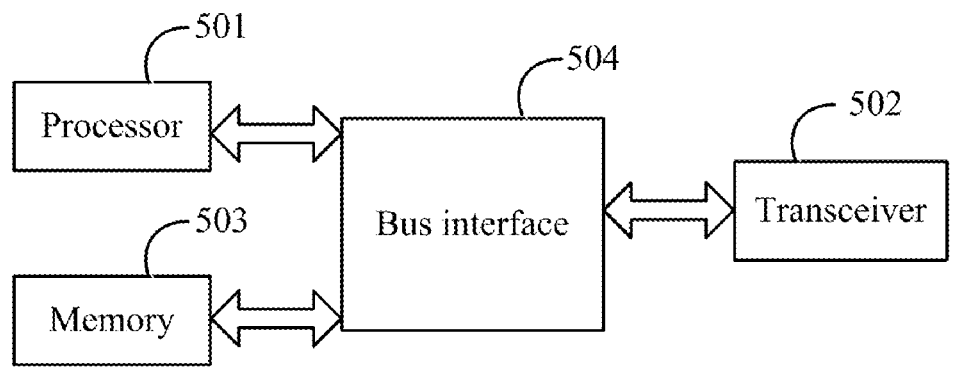
FIG. 5 is a schematic structural diagram of another transmitter according to embodiments of the invention.

FIG. 5 exemplarily illustrates a schematic structural diagram of a transmitter according to embodiments of the invention.

Based upon the same idea, FIG. 5 illustrates a schematic structural diagram of a transmitter according to embodiments of the invention for performing the flow of the method above, where the transmitter includes a processor 501, a transceiver 502, and a memory 503.

The processor 501 is configured to read program in the memory 503, and to perform the following processes.

Selecting a type of Downlink Control Information (DCI) including a first type of DCI and/or a second type of DCI, where the second type of DCI includes a parameter of an interference signal received by a receiver; and transmitting DCI corresponding to the selected type of DCI through the transceiver 502.

The transceiver 502 is configured to be controlled by the processor 501 to transmit the DCI corresponding to the selected type of DCI.

Optionally the first type of DCI does not include any parameter of an interference signal received by the receiver.

Optionally the processor 501 is configured to select the type of DCI semi-statically or dynamically.

Optionally the processor 501 is configured to select the type of DCI according to a type of receiver, and/or an interference suppression scheme, optionally in the following three implementations.

The type of DCI is selected according to a type of receiver; the type of DCI is selected according to an interference suppression scheme; and the type of DCI is selected according to a type of receiver, and an interference suppression scheme.

Optionally the processor 501 is further configured to determine the number of blind detections corresponding to each type of DCI.

The transceiver 502 is further configured to transmit an indicator indicating the number of blind detections corresponding to each type of DCI.

Optionally the transceiver 502 is further configured to transmit an indicator indicating the type of DCI selected by the transmitter.

Optionally the processor 501 is further configured to create a mapping relationship between the type of DCI and a system parameter; and Optionally the transceiver 502 is further configured to transmit the mapping relationship between the type of DCI and the system parameter.

Optionally the transceiver 502 is further configured to transmit the mapping relationship between the type of DCI and the system parameter via dynamic signaling; or to transmit the mapping relationship between the type of DCI and the system parameter via semi-static signaling; or to transmit the mapping relationship between the type of DCI and the system parameter via static signaling.

Optionally the processor 501 is configured to select types of DCI for sub-frames in groups of sub-frames in units of the groups of sub-frames. Particularly a first group of types of DCI is selected for a first group of sub-frames, and a second group of types of DCI is selected for a second group of sub-frames; and the first group of sub-frames does not overlap in time with the second group of sub-frames.

Here in FIG. 5, the bus architecture can include any number of interconnecting buses and bridges to particularly link together various circuits including one or more processors represented by the processor 501, and one or more memories represented by the memory 503 via a bus interface 504. The bus architecture can further link together various other circuits, e.g., prophetical devices, manostats, power management circuits, etc., all of which are well known in the art, so a further description thereof will be omitted in this context. The bus interface serves as an interface. The transceiver 502 can be a number of elements including a transmitter and a receiver which are units for communication with various other devices over a transmission medium. The processor 501 is responsible for managing the bus architecture and performing normal processes, and the memory 503 can store data for use by the processor 500 in performing the operations.

In summary, in embodiments of the invention, the transmitter can transmit the first type of DCI and/or the second type of DCI flexibly and selectively. On one hand, the receiver can suppress interference of the received interference signal by suppressing interference using the parameter of an interference signal received by the receiver, in the received DCI corresponding to the second type of DCI, thus making it easier and more convenient for the receiver to suppress the interference; and on the other hand, if the receiver does not suppress interference of the received interference signal, then the transmitter may selectively transmit the DCI corresponding to the first type of DCI, which does not include any parameter of an interference signal received by the receiver, thus reducing a load of data transmission, and further lowering the complexity of the receiver in processing the data.

Figure 6:
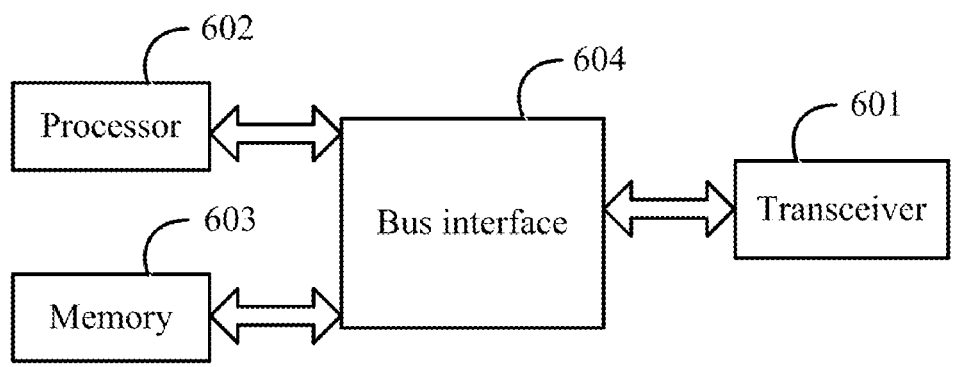
FIG. 6 is a schematic structural diagram of another user equipment according to embodiments of the invention.

FIG. 6 exemplarily illustrates a schematic structural diagram of a receiver according to embodiments of the invention.

Based upon the same idea, FIG. 6 illustrates a schematic structural diagram of a receiver according to embodiments of the invention for performing the flow of the method above, where the receiver includes a transceiver 601, a processor 602, and a memory 603.

The transceiver 601 is configured to be controlled by the processor 602 to receive Downlink Control Information (DCI) corresponding to a type of DCI selected by a transmitter, where the type of DCI includes a first type of DCI and/or a second type of DCI, and the second type of DCI includes a parameter of an interference signal received by the receiver; and the processor 602 is configured to decode the DCI received by the transceiver 601.

Optionally the first type of DCI does not include any parameter of an interference signal received by the receiver.

The processor 602 is configured to read program in the memory 603, and decode the received DCI.

Optionally the processor 602 is further configured to detect each type of DCI blindly according to a received indicator indicating the number of blind detections corresponding to each type of DCI.

Optionally the processor 602 is further configured to detect each type of DCI blindly according to a prescribed number of blind detections corresponding to each type of DCI.

Optionally the processor 602 is further configured to decode the received DCI according to a received indicator indicating the type of DCI selected by the transmitter.

Optionally the processor 602 is further configured to decode the received DCI according to a prescribed type of DCI.

Optionally the processor 602 is further configured to determine a type of DCI corresponding to a system parameter and a received mapping relationship between the type of DCI and the system parameter, and to decode the received DCI according to the determined type of DCI.

Optionally the processor 602 is further configured to determine a type of DCI corresponding to a system parameter and a prescribed mapping relationship between the type of DCI and the system parameter, and to decode the received DCI according to the determined type of DCI.

Optionally the processor 602 is further configured to determine the type of DCI corresponding to the received DCI according to a prescribed correspondence relationship between a sub-frame number and the type of DCI, and the sub-frame number corresponding to the received DCI, and to decode the received DCI according to the determined type of DCI.

Optionally the processor 602 is further configured to decode the received DCI according to the type of the receiver.

Optionally a decoding mode corresponding to the type of DCI includes any one of the following modes.

Detecting and decoding the first type of DCI; detecting and decoding the second type of DCI; and detecting and decoding the first type of DCI and the second type of DCI.

Here in FIG. 6, the bus architecture can include any number of interconnecting buses and bridges to particularly link together various circuits including one or more processors represented by the processor 602, and one or more memories represented by the memory 603 via a bus interface 604. The bus architecture can further link together various other circuits, e.g., prophetical devices, manostats, power management circuits, etc., all of which are well known in the art, so a further description thereof will be omitted in this context. The bus interface serves as an interface. The transceiver 601 can be a number of elements including a transmitter and a receiver which are units for communication with various other devices over a transmission medium. The processor 602 is responsible for managing the bus architecture and performing normal processes, and the memory 603 can store data for use by the processor 602 in performing the operations.

In summary, in the embodiment of the invention, the transmitter can transmit the first type of DCI and/or the second type of DCI flexibly and selectively, so that on one hand, the receiver can suppress interference of the received interference signal by suppressing interference using the parameter of an interference signal received by the receiver, in the received DCI corresponding to the second type of DCI, thus making it easier and more convenient for the receiver to suppress the interference; and on the other hand, if the receiver does not suppress interference of the received interference signal, then the transmitter may selectively transmit the DCI corresponding to the first type of DCI, which does not include any parameter of an interference signal received by the receiver, thus reducing a load of data transmission, and further lowering the complexity of the receiver in processing the data.

The foregoing disclosure is merely illustrative of the preferred embodiments of the invention, but not intended to limit the invention thereto, and any modifications, equivalent substitutions, adaptations, etc., made thereto without departing from the spirit and principle of the invention shall come into the scope of the invention as claimed.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting control information, the method comprises steps of:
    selecting a type of Downlink Control Information (DCI), the type of DCI comprises at least one of a first type of DCI excluding any parameter of an interference signal received by a receiver and a second type of DCI comprising a parameter of an interference signal received by the receiver; and
    transmitting DCI corresponding to selected type of DCI; wherein selecting a type of DCI comprises:
    selecting the type of DCI according to a mapping relationship between a prescribed type of DCI and a system parameter; or
    selecting the type of DCI according to a prescribed correspondence relationship between a sub-frame number and the type of DCI; or
    selecting the type of DCI according to a type of receiver, and/or an interference suppression scheme.

2. The method according to claim 1, wherein the selecting the type of DCI comprises:
    selecting the type of DCI semi-statically or dynamically.

3. The method according to claim 1, wherein the method further comprises:
    determining a number of blind detections corresponding to each type of DCI; and
    transmitting an indicator indicating the number of blind detections corresponding to each type of DCI.

4. The method according to claim 1, wherein the method further comprises:
    creating a mapping relationship between the type of DCI and a system parameter; and
    transmitting the mapping relationship between the type of DCI and the system parameter.

5. The method according to claim 1, wherein the selecting the type of DCI comprises:
    selecting types of DCI for sub-frames in groups of sub-frames in the units of the groups of sub-frames.

6. The method according to claim 1, wherein the method further comprises:
    transmitting an indicator indicating the selected type of DCI.

7. A method for receiving control information, the method comprises steps of:
    receiving Downlink Control Information (DCI) corresponding to a type of DCI selected by a transmitter, wherein the type of DCI comprises at least one of a first type of DCI excluding any parameter of an interference signal received by a receiver and a second type of DCI comprising a parameter of an interference signal received by the receiver; and
    decoding received DCI;
    wherein the decoding the received DCI comprises:
    decoding the received DCI according to a prescribed type of DCI, the prescribed type of DCI is predefined in standard and is not transmitted in any indicator indicating a type of DCI selected by the transmitter; or
    determining a type of DCI corresponding to a system parameter and a received mapping relationship between the type of DCI and the system parameter, and decoding the received DCI according to determined type of DCI; or
    determining a type of DCI corresponding to a system parameter and a prescribed mapping relationship between the type of DCI and the system parameter, and decoding the received DCI according to determined type of DCI; or
    determining a type of DCI according to a sub-frame number corresponding to the received DCI and a prescribed correspondence relationship between the sub-frame number and the type of DCI, and decoding the received DCI according to determined type of DCI; or
    determining a type of DCI according to a type of receiver and/or an interference suppression scheme, and decoding the received DCI according to determined type of DCI.

8. The method according to claim 7, wherein the method further comprises:
    receiving an indicator indicating a number of blind detections corresponding to each type of DCI, and detecting each type of DCI blindly according to the indicator indicating the number of blind detections corresponding to each type of DCI; or
    detecting each type of DCI blindly according to a prescribed number of blind detections corresponding to each type of DCI.

9. The method according to claim 7, wherein a decoding mode corresponding to the type of DCI comprises any one of following modes:
- detecting and decoding the first type of DCI;
- detecting and decoding the second type of DCI; and
- detecting and decoding the first type of DCI and the second type of DCI.

10. A transmitter, comprising a memory configured to store computer-readable programs and at least one processor, wherein the at least one processor is configured to execute the computer-readable programs:
- to select a type of Downlink Control Information (DCI), wherein the type of DCI comprises at least one of a first type of DCI excluding any parameter of an interference signal received by a receiver and a second type of DCI comprising a parameter of an interference signal received by the receiver; and
- to transmit DCI corresponding to selected type of DCI;
- wherein the at least one processor is configured to execute the computer-readable programs to select the DCI by:
- selecting the type of DCI according to a mapping relationship between a prescribed type of DCI and a system parameter; or
- selecting the type of DCI according to a prescribed correspondence relationship between a sub-frame number and the type of DCI; or
- selecting the type of DCI according to a type of receiver, and/or an interference suppression scheme.

11. The transmitter according to claim 10, wherein the at least one processor is configured to execute the computer-readable programs to select a type of DCI by: selecting the type of DCI semi-statically or dynamically.

12. The transmitter according to claim 10, wherein the at least one processor is further configured to execute the computer-readable programs:
- to determine a number of blind detections corresponding to each type of DCI; and
- the at least one processor is further configured to execute the computer-readable programs:
- to transmit an indicator indicating the number of blind detections corresponding to each type of DCI.

13. The transmitter according to claim 10, wherein the at least one processor is further configured to execute the computer-readable programs:
- to create a mapping relationship between the type of DCI and a system parameter; and
- the at least one processor is further configured to execute the computer-readable programs:
- to transmit the mapping relationship between the type of DCI and the system parameter.

14. The transmitter according to claim 10, wherein the at least one processor is configured to execute the computer-readable programs to select a type of DCI by:
- selecting types of DCI for sub-frames in groups of sub-frames in units of the groups of sub-frames.

15. The transmitter according to claim 10, wherein the at least one processor is further configured to execute the computer-readable programs:
- to transmit an indicator indicating the selected type of DCI.

16. A receiver, comprising a memory configured to store computer-readable programs and at least one processor, wherein the at least one processor is configured to execute the computer-readable programs:
- to receive Downlink Control Information (DCI) corresponding to a type of DCI selected by a transmitter, wherein the type of DCI comprises at least one of a first type of DCI excluding any parameter of an interference signal received by a receiver and a second type of DCI comprising a parameter of an interference signal received by the receiver; and
- to decode received DCI;
- wherein the at least one processor is configured to execute the computer-readable programs to decode received DCI by:
- decoding the received DCI according to a prescribed type of DCI, the prescribed type of DCI is predefined in standard and is not transmitted in any indicator indicating a type of DCI selected by the transmitter; or
- the at least one processor is further configured to execute the computer-readable programs:
- to determine a type of DCI corresponding to a system parameter and a received mapping relationship between the type of DCI and the system parameter, and to decode the received DCI according to determined type of DCI; or
- to determine a type of DCI corresponding to a system parameter and a prescribed mapping relationship between the type of DCI and the system parameter, and to decode the received DCI according to determined type of DCI; or
- to determine a type of DCI according to a sub-frame number corresponding to the received DCI and a prescribed correspondence relationship between the sub-frame number and the type of DCI, and to decode the received DCI according to determined type of DCI; or
- to determine a type of DCI according to a type of receiver and/or an interference suppression scheme, and decoding the received DCI according to determined type of DCI.

17. The receiver according to claim 16, wherein the at least one processor is further configured to execute the computer-readable programs:
- to detect each type of DCI blindly according to a received indicator indicating a number of blind detections corresponding to each type of DCI; or
- to detect each type of DCI blindly according to a prescribed number of blind detections corresponding to each type of DCI.

18. The receiver according to claim 16, wherein a decoding mode corresponding to the type of DCI includes any one of following modes:
- detecting and decoding the first type of DCI;
- detecting and decoding the second type of DCI; and
- detecting and decoding the first type of DCI and the second type of DCI.

* * * * *